United States Patent
Larsen (10) Patent No.: US 8,120,202 B2
(45) Date of Patent: Feb. 21, 2012

(54) ELECTRIC POWER TRANSMISSION SYSTEM FOR WIND TURBINE AND WIND TURBINE FARM AND METHOD FOR OPERATING SAME

(75) Inventor: Einar Vaughn Larsen, Ballston Lake, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/911,328

(22) Filed: Oct. 25, 2010

(65) Prior Publication Data

US 2011/0140511 A1    Jun. 16, 2011

(51) Int. Cl.
*H02J 3/00* (2006.01)
*H02J 3/36* (2006.01)
(52) U.S. Cl. ............................................ 307/31; 363/35
(58) Field of Classification Search ............... 307/31; 363/35
See application file for complete search history.

(56) References Cited

U.S. PATENT DOCUMENTS

| | | | |
|---|---|---|---|
| 4,906,213 A * | 3/1990 | Esthimer | 440/50 |
| 7,391,126 B2 | 6/2008 | Liu et al. | |
| 7,394,166 B2 | 7/2008 | Teichmann et al. | |
| 2008/0284172 A1 | 11/2008 | Nielsen | |
| 2010/0013224 A1 | 1/2010 | Edenfeld | |

OTHER PUBLICATIONS

J. Green, A. Bowen, L. J. Fingersh, and Y. Wan, Electrical Collection and Transmission Systems for Offshore Wind Power, Preprint, NREL National Renewable Energy Laboratory, A National Laboratory of the U.S. Department of Energy, Office of Energy Efficiency & Renewable Energy, Midwest Research Institute (MRI), Contract No. DE-AC36-99-GO10337, Conference Paper, NREL/CP-500-41135, Mar. 2007, 10 pages.

* cited by examiner

Primary Examiner — Rexford Barnie
Assistant Examiner — Dru Parries
(74) *Attorney, Agent, or Firm* — James McGinness, Esq.; Armstrong Teasdale LLP (57) ABSTRACT

A method of operating a wind turbine includes energizing at least a portion of a power conversion assembly via an alternating current (AC) power source. The method also includes converting AC power to direct current (DC) power having a DC component and an AC component via the power conversion assembly. The method further includes transmitting the DC component and the AC component through a DC power transmission line. The method also includes separating the DC component from the AC component. The method further includes transmitting the AC component to at least one wind turbine electrical device.

20 Claims, 5 Drawing Sheets

ELECTRIC POWER TRANSMISSION SYSTEM FOR WIND TURBINE AND WIND TURBINE FARM AND METHOD FOR OPERATING SAME

BACKGROUND OF THE INVENTION

The subject matter described herein relates generally to wind turbines and, more particularly, to an electric power transmission system for a wind turbine in a geographically-isolated wind turbine farm and black start capabilities thereof.

Generally, a wind turbine includes a rotor that includes a rotatable hub assembly having multiple blades. The blades transform wind energy into a mechanical rotational torque that drives one or more generators via the rotor. The generators are sometimes, but not always, rotationally coupled to the rotor through a gearbox. The gearbox steps up the inherently low rotational speed of the rotor for the generator to efficiently convert the rotational mechanical energy to electric energy. Gearless direct drive wind turbines also exist. The rotor, generator, gearbox and other components are typically mounted within a housing, or nacelle, that is positioned on a base that includes a truss or tubular tower. The generated electric power is transmitted to an electric grid via at least one electrical connection. Such known wind turbines are typically coupled to the electric grid via a known full power conversion assembly. Such known full power conversion assemblies include a rectifier portion that converts alternating current (AC) generated by the generator to direct current (DC) and an inverter that converts the DC to AC of a predetermined frequency and voltage amplitude.

At least some of the known wind turbines are physically positioned in a remote geographical region or in an area where physical access is difficult, such as, off-shore installations. These wind turbines may be physically nested together in a common geographical region to form a wind turbine farm and are electrically coupled to a common AC collector system. Many of these known wind turbine farms include a separated full power conversion assembly electrically coupled to the AC collector system. The rectifier portion of the separated full power conversion assembly is positioned in close vicinity of the associated wind turbines and the inverter portion of the separated full power conversion assembly is positioned in a remote facility, such as a land-based facility. Such rectifier and inverter portions are typically electrically connected via submerged high voltage direct current (HVDC) electric power cables.

Known wind turbines include support equipment that facilitates operation of such wind turbines, for example, blade pitch drive motors and lubrication pump motors. Moreover, such equipment is typically positioned in the nacelle or the tower. Further, many known wind turbines include auxiliary power equipment that receives at least a portion of electric power generated by the generators in the wind turbine farm to facilitate electrically powering such support equipment via the AC collector system. A single wind turbine generator in the wind turbine farm typically has sufficient electric power generation capacity to power the equipment for the remaining wind turbines that are removed from service.

In the event that all of the wind turbine generators in the remote farm are removed from service, an alternative method of transmitting electric power to the auxiliary power equipment and the associated wind turbine support equipment must be used to facilitate a restart of at least one wind turbine generator, i.e., to perform a black start of the wind farm. One such method is providing additional equipment, for example, a diesel-powered generator, locally positioned in the vicinity of the tower or within the tower. Another such method may include independent electric power transmission equipment, portions of which may need to be positioned within the tower and/or a land-based facility, those portions coupled via independent electric cables. Such additional equipment requires increased capital construction costs and increased operational maintenance costs of the remote wind turbine farm.

BRIEF DESCRIPTION OF THE INVENTION

In one aspect, a method of operating a wind turbine is provided. The method includes energizing at least a portion of a power conversion assembly via an alternating current (AC) power source. The method also includes converting AC power to direct current (DC) power having a DC component and an AC component via the power conversion assembly. The method further includes transmitting the DC component and the AC component through a DC power transmission line. The method also includes separating the DC component from the AC component. The method further includes transmitting the AC component to at least one wind turbine electrical device.

In another aspect, an electric power transmission system for an electric power generator is provided. The electric power transmission system includes a high voltage direct current (HVDC) conductor. The system also includes a power conversion assembly coupled to the HVDC conductor. The power conversion assembly is configured to modulate direct current (DC) power to generate a DC component and an alternating current (AC) component. The system further includes an electrical device coupled to the power conversion assembly configured to remove the DC component from the AC component.

In yet another aspect, a method of performing a black start of a wind turbine positioned in a wind turbine farm is provided. The method includes coupling each of a plurality of wind turbines to an alternating current (AC) collector system such that the AC collector system is substantially the sole source of electrical power to each wind turbine. The method also includes converting AC power transmitted from an AC power grid to direct current (DC) power having a DC component and an AC component. The method further includes transmitting the DC component and the AC component through a DC power transmission line. The method also includes separating the DC component from the AC component. The method further includes transmitting the AC component to the AC collector system.

DETAILED DESCRIPTION OF THE INVENTION

The embodiments described herein provide an auxiliary electric power transmission system for a wind turbine and a wind turbine farm. The auxiliary electric power transmission system at least partially includes existing wind turbine and wind turbine farm hardware to facilitate black start capabilities of each wind turbine. In one embodiment, the auxiliary electric power transmission system transmits auxiliary electric power to a remote wind turbine via an existing high voltage direct current (HVDC) cable. In another embodiment, the auxiliary electric power transmission system transmits auxiliary electric power to a plurality of remote wind turbines nested in a wind turbine farm via a plurality of existing HVDC cables. Moreover, the embodiments described herein use at least some of the additional existing hardware, such as at least a portion of the full power converters, such that the auxiliary electric power transmission system as described herein decreases capital costs of construction and operational costs associated with routine preventative and corrective maintenance.

A technical effect of the wind turbine and wind turbine farm auxiliary electric power transmission system described herein is to facilitate black start capabilities of geographically-remote wind turbines. In one embodiment, a technical effect of the wind turbine and wind turbine farm auxiliary electric power transmission system described herein includes transmitting sufficient auxiliary electric power to auxiliary equipment in a remote wind turbine to support a restart of the associated wind turbine. A further technical effect of the auxiliary electric power transmission system described herein is to facilitate shifting the system to a standby condition when the wind turbine is generating sufficient auxiliary electric power to support the auxiliary equipment.

As used herein, the term "black start" refers to providing electric power to at least one wind turbine in a geographically-isolated wind turbine farm from a source external to the wind turbine farm. A black start condition is considered to exist when there are no wind turbine generators in service in the wind turbine farm and there are no other sources of electric power in the geographically-isolated wind turbine farm to facilitate a restart of at least one wind turbine therein.

Figure 1:
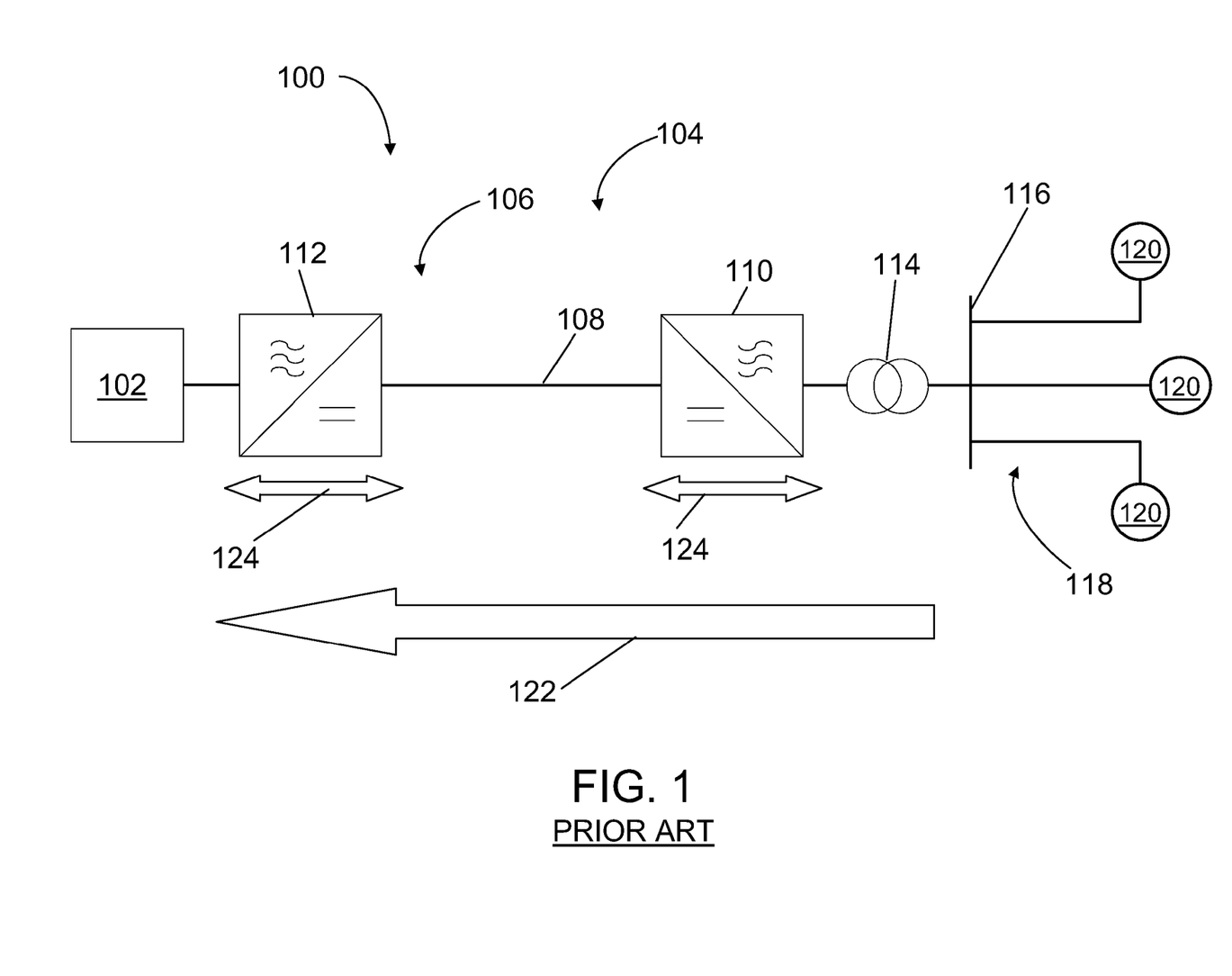
FIG. 1 is a schematic view of a prior art wind turbine farm electric power transmission system.

FIG. 1 is a schematic view of a prior art wind turbine farm electric power transmission system 100. An electric power transmission and distribution grid 102 is electrically coupled to and receives electric power from system 100. System 100 includes a high voltage direct current (HVDC) system 104. HVDC system 104 typically includes a separated full power conversion assembly 106 and at least one HVDC conductor or HVDC transmission line 108 that includes any number of cables and is manufactured of any materials that enable operation of system 104 and HVDC transmission line 108 as described herein.

In at least some embodiments, HVDC transmission line 108 includes a plurality of bipolar HVDC cables (not shown) that further include a plurality of poles. The voltages at each pole are modulated by substantially similar values, however, such voltages at each pole are modulated approximately 90° out of phase with the other pole, thereby facilitating a reduction of alternating current (AC) power transmission through HVDC transmission line 108.

Full power conversion assembly 106 typically includes a rectifier portion 110 that receives and rectifies three-phase, sinusoidal, AC power to direct current (DC) power at a pre-determined voltage. Full power conversion assembly 106 also typically includes an inverter portion 112 that is electrically coupled to rectifier portion 110 via HVDC transmission line 108. Inverter portion 112 receives DC power transmitted from rectifier portion 110 and converts the DC power to three-phase, sinusoidal AC power with pre-determined voltages, currents, and frequencies. Full power conversion assembly 106 further includes any other components typically associated with full power conversion assemblies that enable operation of system 104 as described herein including, but not limited to, DC rails and capacitive devices (neither shown).

System 100 also includes a step-up transformer 114 electrically coupled to system 104 and an AC collector system 116. AC collector system 116 is coupled to a wind turbine farm 118 that includes a plurality of wind turbines 120. In the exemplary embodiment, wind turbines 120 are electric power generators. In the exemplary embodiment, wind turbines 120 and wind turbine farm 118 are at least partially defined geographically and/or electrically, i.e., wind turbine farm 118 may be defined by a number of wind turbines 120 in a particular geographic area, or alternatively, defined by each wind turbine's 120 electrical connectivity to a common AC collector system, or substation. In the exemplary embodiment, HVDC transmission line 108 is at least partially submerged. Alternatively, wind turbines 120 and wind turbine farm 118 are geographically located in rugged and/or remote terrain, for example, mountainous hillsides. Inverter portion 112 may be geographically located in any accessible terrain separate from that of wind turbines 120 and wind turbine farm 118. Further, HVDC transmission line 108 may be extended between inverter portion 112 and rectifier portion 110 across/through any terrain in any manner that facilitates operation of system 100 as described herein.

Moreover, a plurality of wind turbine auxiliary loads (not shown) are powered from AC collector system 116. Such auxiliary loads include wind turbine support equipment including, without limitation, blade pitch drive motors and shaft bearing lubrication drive motors (neither shown). Therefore, these auxiliary loads are typically powered with a portion of electric power generated by at least one of wind turbines 120 via AC collector system 116.

In operation, each wind turbine 120 in wind farm 118 converts rotational mechanical power to electric power that includes sinusoidal, three-phase AC. Electric power generated by wind farm 118 is transmitted to AC collector system 116 at a voltage amplitude of approximately 33 kilovolts (kV) AC. Transformer 114 steps up the voltage amplitude of the electric power from approximately 33 kV AC to approximately 150 kV AC, and transmits the stepped-up voltage to full power conversion assembly 106, i.e., to rectifier portion 110. Rectifier portion 110 rectifies the electric power from sinusoidal, three-phase AC power to DC power. The DC power is transmitted via HVDC transmission line 108 to inverter portion 112 that converts the DC power to three-phase, sinusoidal AC power with pre-determined voltages, currents, and frequencies for further transmission to electric power transmission and distribution grid 102.

In general, electric power flow from wind farm 118 through system 100 to grid 102 is in the direction of arrow 122. However, both rectifier portion 110 and inverter portion 112 may be bidirectional as shown by arrows 124.

Figure 2:
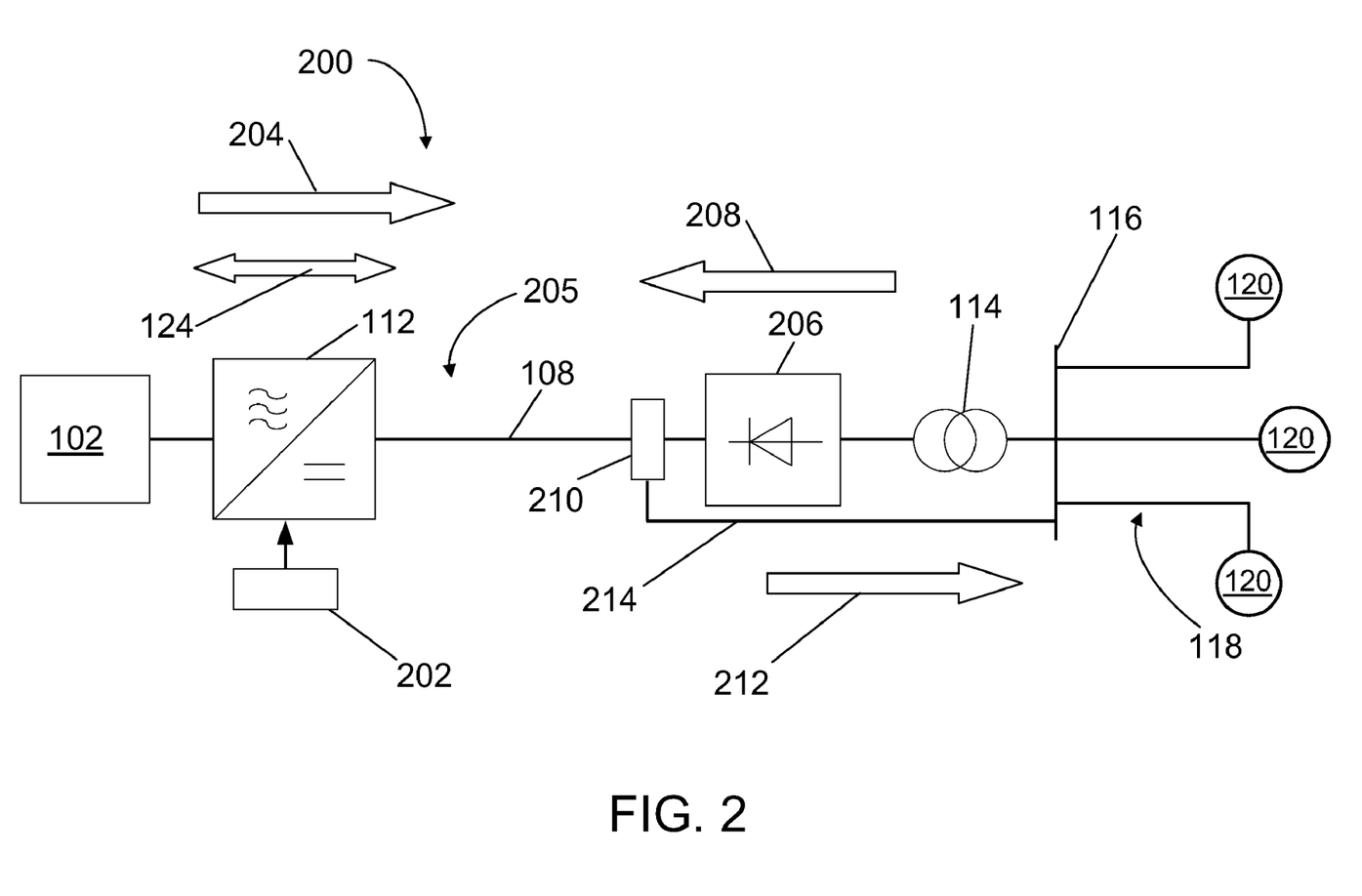
FIG. 2 is a schematic view of an exemplary wind turbine farm auxiliary electric power transmission system.

FIG. 2 is a schematic view of an exemplary wind turbine farm auxiliary electric power transmission system 200. In the exemplary embodiment, system 200 includes bidirectional inverter portion 112 electrically coupled to HVDC transmission line 108 and grid 102.

In the exemplary embodiment, system 200 includes at least one DC voltage controller 202 operatively coupled to inverter portion 112. Controller 202 is operatively coupled to a DC voltage reference device (not shown) within inverter portion 112. Controller 202 modulates a voltage command signal (not shown) that is transmitted to the DC voltage reference device. The DC voltage reference device is controlled to modulate the DC voltage transmitted towards HVDC transmission line 108, as shown by arrow 204. In the exemplary embodiment, the DC voltage is modulated by approximately 1% of a predetermined DC voltage value at a frequency of approximately 100 Hertz (Hz). Alternatively, any percentile values of voltage modulation at any frequencies that enable operation of system 200 as descried herein are used.

In the exemplary embodiment, controller 202 includes at least one processor and a memory, at least one processor input channel, at least one processor output channel, and may include at least one computer (none shown in FIG. 2). As used herein, the term computer is not limited to integrated circuits referred to in the art as a computer, but broadly refers to a processor, a microcontroller, a microcomputer, a programmable logic controller (PLC), an application specific integrated circuit, and other programmable circuits (none shown in FIG. 2), and these terms are used interchangeably herein. In the exemplary embodiment, memory may include, but is not limited to, a computer-readable medium, such as a random access memory (RAM) (none shown in FIG. 2). Alternatively, a floppy disk, a compact disc-read only memory (CD-ROM), a magneto-optical disk (MOD), and/or a digital versatile disc (DVD) (none shown in FIG. 2) may also be used. In the exemplary embodiment, additional input channels (not shown in FIG. 2) may include, without limitation, computer peripherals associated with an operator interface, such as a mouse or a keyboard (neither shown in FIG. 2). Alternatively, other computer peripherals may also be used that may include, for example, but not be limited to, a scanner (not shown in FIG. 2). Furthermore, in the exemplary embodiment, additional output channels may include, but not be limited to, an operator interface monitor (not shown in FIG. 2).

Processors for controller 202 process information transmitted from at least one HVDC signal measurement device that may include, but not be limited to, voltage transducers (not shown). RAM and the storage device store and transfer information and instructions to be executed by the processor. RAM and the storage devices can also be used to store and provide temporary variables, static (i.e., non-changing) information and instructions, or other intermediate information to the processors during execution of instructions by the processors. Instructions that are executed include, but are not limited to, resident conversion and/or comparator algorithms. The execution of sequences of instructions is not limited to any specific combination of hardware circuitry and software instructions.

In the exemplary embodiment, controller 202 facilitates black start capabilities of wind farm 118, therefore controller 202 typically includes only sufficient hardware and sufficient programming to support those functions necessary to enable operation of system 200 as described herein. For example, controller 202 is typically powered via an external power source, such as inverter portion 112, and may include a battery backup capability (not shown). Controller 202 is programmed to facilitate shifting system 200 from a standby condition to a black start condition in the event that no wind turbines 120 are in operation and from the black start condition to the standby condition when at least one wind turbine 120 is restored to service, i.e., at least one wind turbine 120 is generating electric power. Alternatively, manual control of modes of operation of controller 202 is implemented.

Further, in the exemplary embodiment, system 200 includes a separated full power conversion assembly 205 that is similar to full power conversion assembly 106 (shown in FIG. 1) with the exception that assembly 205 includes a unidirectional rectifier portion 206. Unidirectional rectifier portion 206 is similar to rectifier portion 110 (shown in FIG. 1) with the exception that, unlike rectifier portion 110, rectifier portion 206 does not facilitate two-way electric power flow and only facilitates electric power flow in the direction of arrow 208.

In the exemplary embodiment, system 200 includes an electrical device, i.e., a coupling and filtering unit 210 electrically coupled to AC collector system 116. Coupling and filtering unit 210 includes at least one passive component that is used to block a DC component of voltage transmitted thereto. Coupling and filtering unit 210 in a particular embodiment includes at least one inductive-capacitive circuit, that is, an L-C tank circuit (not shown in FIG. 2) that is discussed further below. Coupling and filtering unit 210 thereby facilitates transmitting a portion of modulated DC power to AC collector system 116 and the auxiliary loads powered therefrom as shown by arrow 212. Further, in the exemplary embodiment, system 200 includes a three-phase transmission line 214 electrically coupled to coupling and filtering unit 210 and AC collector system 116.

Figure 3:
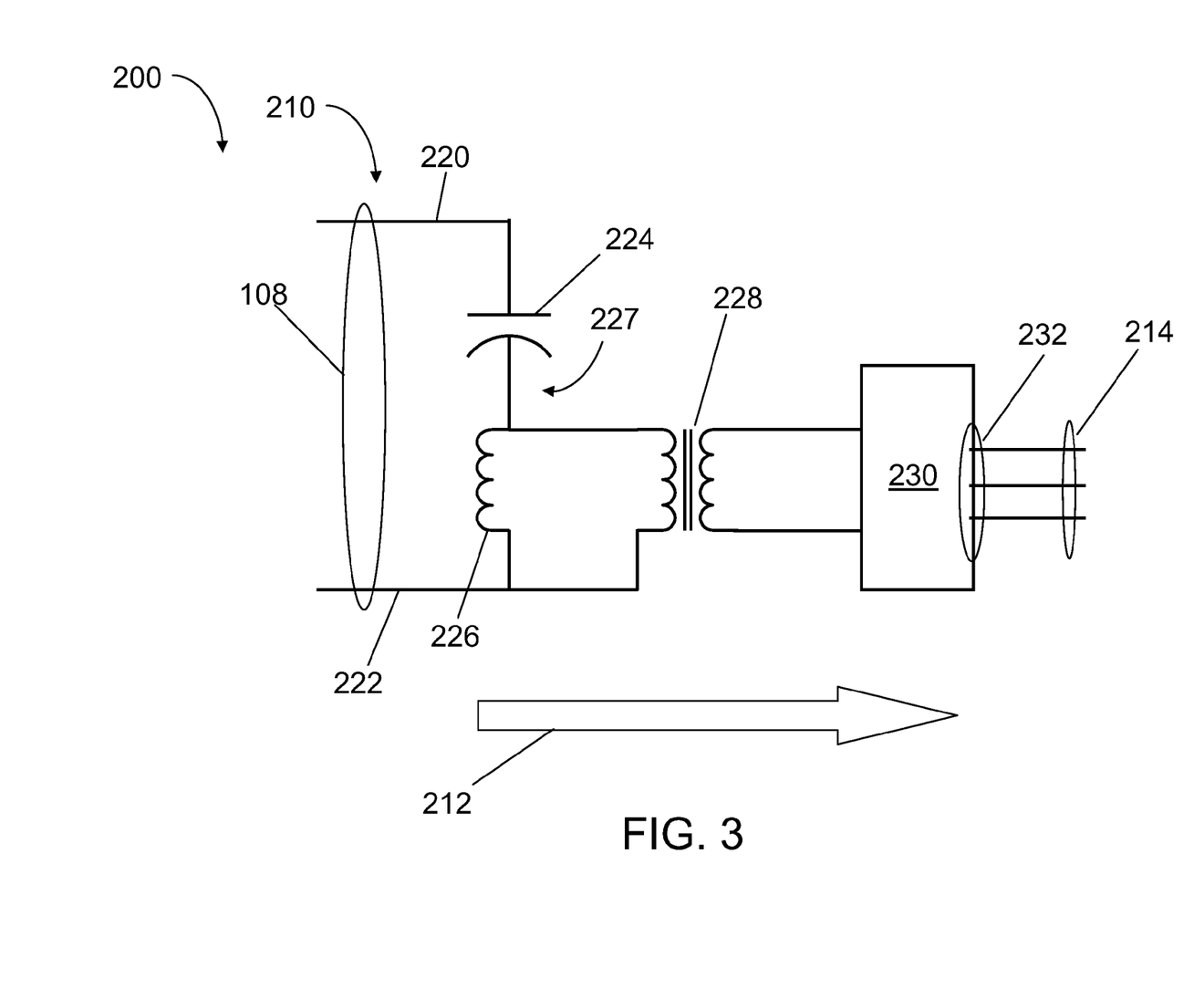
FIG. 3 is a schematic view of an exemplary coupling and power conditioning system that may be used with the wind turbine farm auxiliary electric power transmission system shown in FIG. 2.

FIG. 3 is a schematic view of exemplary coupling and power conditioning unit 210 that may be used with wind turbine farm auxiliary electric power transmission system 200. Coupling and filtering unit 210 includes HVDC line connections 220 and 222 of HVDC transmission line 108 that are typically energized to approximately 150 kV DC. Coupling and filtering unit 210 also includes a coupling capacitor 224 that is rated for at least 150 kV DC and is configured to conduct sufficient electric current for powering the auxiliary power equipment through AC collector system 116 (shown in FIG. 2) at the selected HVDC modulation frequency with a voltage differential across capacitor 224 of approximately 150 kV DC. Coupling and filtering unit 210 further includes a coupling inductor 226 that is rated for approximately 1.5 kV AC and is configured to conduct sufficient electric current for powering the auxiliary power equipment through AC collector system 116 at the selected HVDC modulation frequency. Capacitor 224 and inductor 226 form an L-C tank circuit 227.

In the exemplary embodiment, L-C tank circuit 227 is tuned to a frequency value that is approximate to the frequency of modulation of 100 Hz. Also, L-C tank circuit 227 is tuned to change the frequency of modulation from 100 Hz to 60 Hz or 50 Hz as is necessary for operation of the auxiliary equipment. Coupling and filtering unit 210 thereby facilitates transmitting a portion of modulated DC power to AC collector system 116 as shown by arrow 212 by isolating a DC component of the modulated DC power and transmitting an AC component of the modulated DC power to AC collector system 116 and the auxiliary loads powered therefrom. Alternatively, any circuit configuration that enables operation of system 200 as described herein is used.

Coupling and filtering unit 210 also includes an isolation transformer 228 that is configured to transform the voltage from approximately 1.5 kV AC to a voltage suitable for a power conditioning module 230. Power conditioning module 230 conditions the transformed AC power at the selected modulation frequency of 50 Hz or 60 Hz for use with AC collector system 116 and the auxiliary loads powered therefrom. Further, in the exemplary embodiment, unit 210 includes line connections 232 for three-phase transmission line 214, to electrically couple coupling and filtering unit 210 to AC collector system 116.

Referring to FIGS. 2 and 3, in operation, when each wind turbine 120 in wind farm 118 is removed from service, controller 202 shifts from a standby condition to a black start condition. In the black start condition, grid AC power is transmitted from grid 102 at a standard grid voltage amplitude value to inverter portion 112, wherein the AC power is rectified to a predetermined DC voltage of approximately 150 kV DC that is transmitted through HVDC transmission line 108 to coupling and filtering unit 210. DC voltage controller 202 facilitates modulation of the DC voltage by inverter portion 112 at approximately 1% of a predetermined DC voltage value, i.e., in the exemplary embodiment, approximately 1.5 kV AC, and at a frequency of approximately 100 Hz. Therefore, controller 202 controls inverter portion 112 to transmit a hybrid, or modulated DC voltage that includes a DC component and an AC component.

In operation in the black start condition, coupling and filtering unit 210 receives the modulated DC voltage and facilitates substantially separating the approximately 150 kV DC component of the modulated DC power and transmitting the approximately 1.5 kV AC component of the modulated DC power to transformer 228 at a frequency of approximately 50 Hz or 60 Hz. Transformer 228 transforms the approximately 1.5 kV AC voltage to an auxiliary AC voltage, and the transformed electric power is transmitted to AC collector system 116 and the auxiliary loads powered therefrom.

Figure 4:
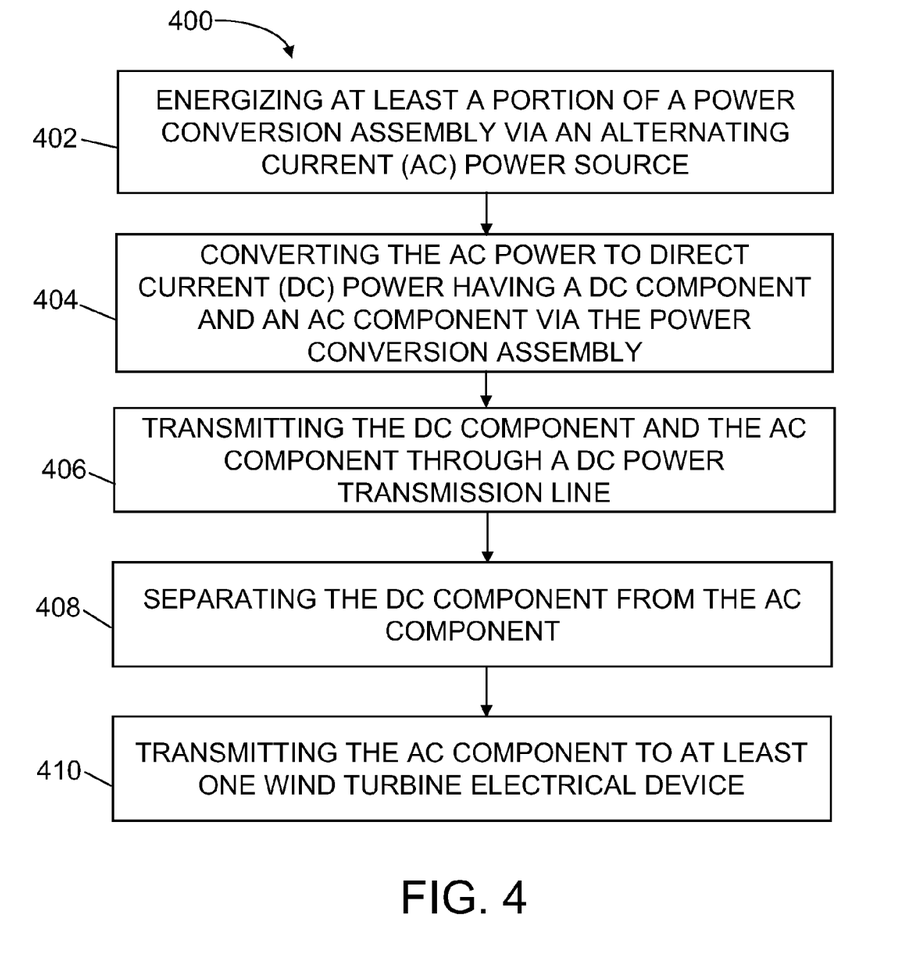
FIG. 4 is a flow diagram of an exemplary method of operating the wind turbine farm auxiliary electric power transmission system shown in FIGS. 2 and 3.

FIG. 4 is a flow diagram of an exemplary method 400 of operating wind turbine 120 (shown in FIGS. 1 and 2), including wind turbine farm 118 (shown in FIGS. 1 and 2) and auxiliary electric power transmission system 200 (shown in FIGS. 2 and 3). In the exemplary embodiment, at least a portion of full power conversion assembly 205 (shown in FIG. 2) is energized 402 via an alternating current (AC) power source, i.e., electric power transmission and distribution grid 102 (shown in FIGS. 1 and 2). The AC power is converted 404 to direct current (DC) power having a DC component and an AC component via full power conversion assembly 205. Further, the DC component and the AC component are transmitted 406 through DC power transmission line 108. The DC component is separated 408 from the AC component and the AC component is transmitted 410 to at least one wind turbine electrical device.

Figure 5:
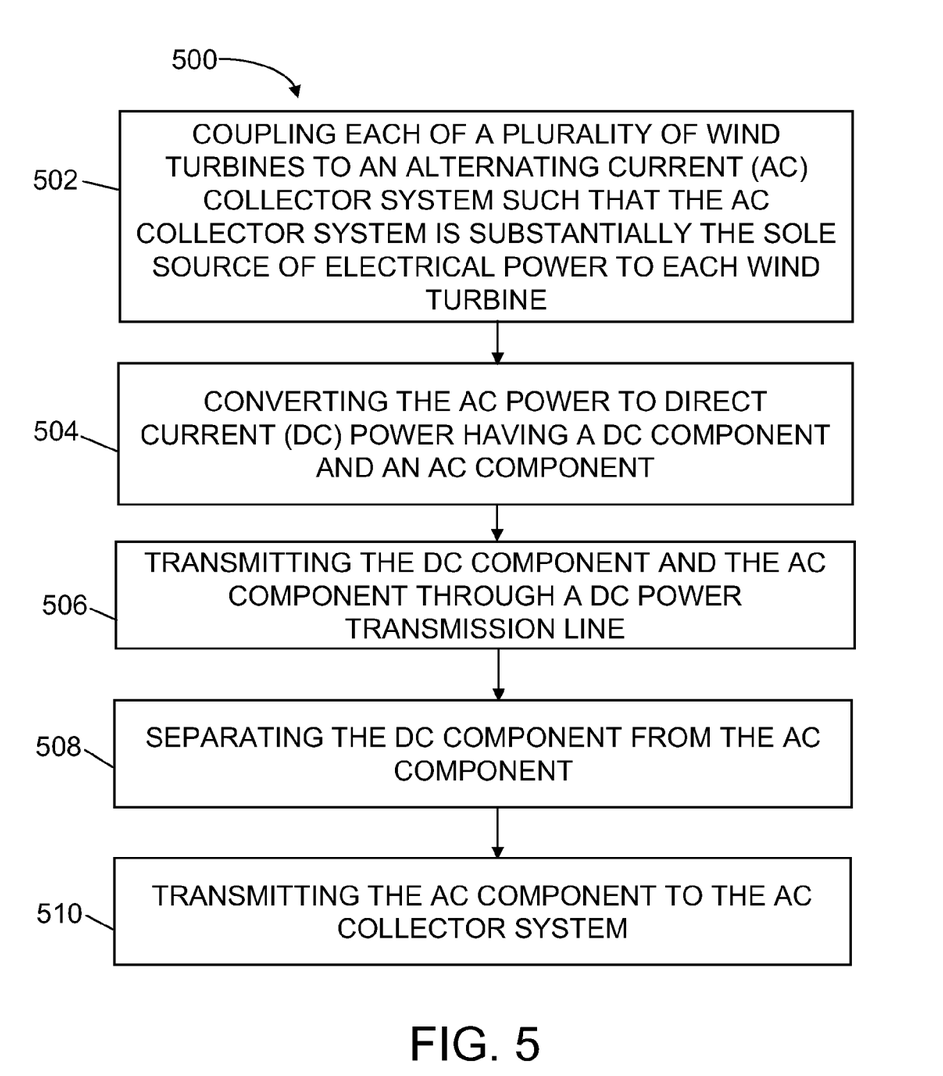
FIG. 5 is a flow diagram of an exemplary method of performing a black start of a wind turbine positioned in a wind turbine farm shown in FIGS. 1 and 2.

FIG. 5 is a flow diagram of an exemplary method 500 of performing a black start of wind turbine 120 (shown in FIGS. 1 and 2) positioned in wind turbine farm 118 (shown in FIGS. 1 and 2). In the exemplary embodiment, each of wind turbines 120 is coupled to alternating current (AC) collector system 116 (shown in FIGS. 1 and 2) such that AC collector system 116 is substantially the sole source of electrical power to each wind turbine 120. The AC power is converted 504 to direct current (DC) power having a DC component and an AC component. Further, the DC component and the AC component are transmitted 506 through DC power transmission line 108 (shown in FIGS. 1, 2, and 3). The DC component is separated 508 from the AC component and the AC component is transmitted 510 to AC collector system 116.

The embodiments described herein provide an auxiliary electric power transmission system for a wind turbine and a wind turbine farm. The auxiliary electric power transmission system at least partially includes existing wind turbine and wind turbine farm hardware to facilitate black start capabilities of each wind turbine. In one embodiment, the auxiliary electric power transmission system transmits auxiliary electric power to a remote wind turbine via an existing high voltage direct current (HVDC) cable. In another embodiment, the auxiliary electric power transmission system transmits auxiliary electric power to a plurality of remote wind turbines nested in a wind turbine farm via a plurality of existing HVDC cables. Moreover, the embodiments described herein use at least some of the additional existing hardware, such as at least a portion of the full power converters, such that the auxiliary electric power transmission system as described herein decreases capital costs of construction and operational costs associated with routine preventative and corrective maintenance.

Exemplary embodiments of a wind turbine, wind turbine farm, an auxiliary electric power transmission system, and a method of operating a wind turbine are described above in detail. The wind turbine, wind turbine farm, auxiliary electric power transmission system, and method are not limited to the specific embodiments described herein, but rather, components of the wind turbine and/or wind turbine farm and/or the auxiliary electric power transmission system and/or steps of the method may be utilized independently and separately from other components and/or steps described herein. For example, the wind turbine, wind turbine farm, auxiliary electric power transmission system, and method may also be used in combination with other power systems and methods, and are not limited to practice with only the wind turbine and wind turbine farm as described herein. Rather, the exemplary embodiment can be implemented and utilized in connection with many other wind turbine or power system applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of operating a wind turbine, said method comprising:
    energizing at least a portion of a power conversion assembly via an alternating current (AC) power source;
    converting AC power to direct current (DC) power having a DC component and an AC component via the power conversion assembly;
    transmitting the DC component and the AC component through a DC power transmission line;
    separating the DC component from the AC component; and,
    transmitting the AC component to at least one wind turbine electrical device.

2. A method in accordance with claim 1, wherein converting AC power to DC power having a DC component and an AC component comprises modulating a voltage amplitude of the DC power.

3. A method in accordance with claim 2, wherein modulating a voltage amplitude of the DC power comprises controlling an inverter portion of a full power conversion assembly.

4. A method in accordance with claim 2, wherein modulating a voltage amplitude of the DC power comprises controlling a frequency of the AC component.

5. A method in accordance with claim 1, wherein transmitting the AC component to at least one wind turbine electrical device comprises performing a black start of the wind turbine.

6. A method in accordance with claim 1, wherein transmitting the AC component to at least one wind turbine electrical device comprises performing a black start of a first wind turbine in a wind turbine farm.

7. A method in accordance with claim 1, wherein energizing at least a portion of a power conversion assembly via an AC power source comprises electrically coupling an inverter portion of a full power conversion assembly to an AC power grid.

8. A method in accordance with claim 1, wherein separating the DC component from the AC component comprises transmitting the DC component and the AC component to an inductive-capacitive circuit.

9. An electric power transmission system for an electric power generator, said electric power transmission system comprising:
   a high voltage direct current (HVDC) conductor;
   a power conversion assembly coupled to said HVDC conductor, said power conversion assembly configured to modulate direct current (DC) power to generate a DC component and an alternating current (AC) component to be supplied onto the HVDC conductor; and,
   an electrical device coupled to said power conversion assembly, said electrical device configured to separate the DC component from the AC component and supply the AC component to at least one wind turbine electrical device.

10. An electric power transmission system in accordance with claim 9, wherein said power conversion assembly comprises at least one of:
    a bidirectional inverter portion of a full power conversion assembly; and,
    a unidirectional rectifier portion of said full power conversion assembly.

11. An electric power transmission system in accordance with claim 10, wherein said electrical device comprises a filter unit coupled to said unidirectional rectifier portion of said full power conversion assembly.

12. An electric power transmission system in accordance with claim 11, wherein said filter unit comprises at least one device that isolates the DC component of the modulated DC power and transmits the AC component of the modulated DC power.

13. An electric power transmission system in accordance with claim 9, further comprising at least one controller operatively coupled to said power conversion assembly, said controller programmed to facilitate modulating DC power to generate the DC component and the AC component.

14. An electric power transmission system in accordance with claim 13, wherein said controller is programmed to modulate a voltage amplitude of DC power transmitted from a bidirectional inverter portion of a full power conversion assembly.

15. A method of performing a black start of a wind turbine positioned in a wind turbine farm, said method comprising:
    coupling each of a plurality of wind turbines to an alternating current (AC) collector system such that the AC collector system is substantially the sole source of electrical power to each wind turbine;
    converting AC power transmitted from an AC power grid to direct current (DC) power having a DC component and an AC component;
    transmitting the DC component and the AC component through a DC power transmission line;
    separating the DC component from the AC component; and,
    transmitting the AC component to the AC collector system.

16. A method in accordance with claim 15, wherein converting AC power to DC power having a DC component and an AC component comprises energizing at least a portion of a power conversion assembly via an alternating current (AC) power source.

17. A method in accordance with claim 15, wherein converting AC power to DC power having a DC component and an AC component comprises modulating a voltage amplitude of the DC power.

18. A method in accordance with claim 17, wherein modulating a voltage amplitude of the DC power comprises controlling an inverter portion of a full power conversion assembly.

19. A method in accordance with claim 17, wherein modulating a voltage amplitude of the DC power comprises controlling a frequency of the AC component.

20. A method in accordance with claim 15, wherein separating the DC component from the AC component comprises transmitting the DC component and the AC component to an inductive-capacitive circuit.

* * * * *